(12) United States Patent
Russell et al.

(10) Patent No.: US 10,867,444 B2
(45) Date of Patent: Dec. 15, 2020

(54) SYNTHETIC DATA GENERATION FOR TRAINING A MACHINE LEARNING MODEL FOR DYNAMIC OBJECT COMPOSITING IN SCENES

(71) Applicant: Adobe Inc., San Jose, CA (US)

(72) Inventors: Bryan Russell, San Jose, CA (US); Daniel Kaufman, San Jose, CA (US); Carlo Innamorati, San Jose, CA (US); Niloy Mitra, San Jose, CA (US)

(73) Assignee: Adobe Inc., San Jose, CA (US)

( * ) Notice: Subject to any disclaimer, the term of this patent is extended or adjusted under 35 U.S.C. 154(b) by 10 days.

(21) Appl. No.: 16/205,132

(22) Filed: Nov. 29, 2018

(65) Prior Publication Data
US 2020/0175759 A1 Jun. 4, 2020

(51) Int. Cl.
| | | |
|---|---|---|
| *G06T 19/00* | (2011.01) | |
| *G06T 15/20* | (2011.01) | |
| *G06N 20/00* | (2019.01) | |
| *G06F 3/01* | (2006.01) | |
| *G06K 9/62* | (2006.01) | |
| *G06T 17/00* | (2006.01) | |

(52) U.S. Cl.
CPC .............. *G06T 19/00* (2013.01); *G06F 3/017* (2013.01); *G06K 9/6256* (2013.01); *G06N 20/00* (2019.01); *G06T 15/20* (2013.01); *G06T 17/00* (2013.01)

(58) Field of Classification Search
CPC ......... G06T 19/00; G06T 17/00; G06T 15/20; G06N 20/00; G06F 3/017; G06K 9/6256
See application file for complete search history.

(56) References Cited

U.S. PATENT DOCUMENTS

2015/0371433 A1* 12/2015 Lecocq .................. G06T 15/60
345/422

OTHER PUBLICATIONS

Ho. et al. NeuralKart: A Real-Time Mario Kart 64 AI, Standford, Jul, 2, 2017, pp. 1-9. Retrieved from: http://cs231n.stanford.edu/reports/2017/pdfs/624.pdf Date Retrieved from: http://cs231n.stanford.edu/reports/2017/pdfs/ (Year: 2017).*

Pascanu, Battaglia, P., et al., "K.: Interaction Networks for Learning About Objects, Relations and Physics", Advances in Neural Information Processing Systems (NIPS), 2016, 9 pages.

Ullman, Chang, M.B.,et al., "A Compositional Object-Based Approach to Learning Physical Dynamics". In: Proceedings of the International Conference on Learning Representations (ICLR), 2017, arXiv:1612.00341 submitted Dec. 2016, 15 pages.

(Continued)

*Primary Examiner* — Robert J Craddock
(74) *Attorney, Agent, or Firm* — Kilpatrick Townsend & Stockton LLP (57) ABSTRACT

This application relates generally to augmenting images and videos with dynamic object compositing, and more specifically, to generating synthetic training data to train a machine learning model to automatically augment an image or video with a dynamic object. The synthetic training data may contain multiple data points from thousands of simulated dynamic object movements within a virtual environment. Based on the synthetic training data, the machine learning model may determine the movement of a new dynamic object within new virtual environment.

20 Claims, 9 Drawing Sheets
(4 of 9 Drawing Sheet(s) Filed in Color)

(56) References Cited

OTHER PUBLICATIONS

Monszpart, Ehrhardt, et al., "Learning a Physical Long-Term Predictor", CoRR abs/1703.00247, 2017, arXiv.1703.00247. Mar. 2017, 10 pages.
Monszpart, Ehrhardt, et al., "Learning to Represent Mechanics Via Long-Term Extrapolation and Interpolation", CoRR abs/1706.02179, 2017, arXiv.1703.00247, Jun. 2017, 10 pages.
Fragkiadaki, Katerina, et al., "Learning Predictive Visual Models of Physics for Playing Billiards", Proceedings of the International Conference on Learning Representations (ICLR), 2016, arXiv:1511.07404v3, submitted Jan. 2016, 12 pages.
Watters, Nicholas, et al., "Visual Interaction Networks", CoRR abs/1706.01433, 2017, arXiv:1706.01433v1, Jun. 2017, 14 pages.
Zhu, Yuke., et al., "Visual Semantic Planning Using Deep Successor Representations", Proceedings of IEEE International Conference on Computer Vision (ICCV), 2017, 10 pages.
Zhu, Yuke., et al., "Target-Driven Visual Navigation in Indoor Scenes Using Deep Reinforcement Learning", Proceedings of the International Conference on Robotics and Automation (ICRA), 2017, arXiv:1609.05143v1, submitted Sep. 2016, 8 pages.
Xavier Puig, et al., "VirtualHome: Simulating Household Activities Via Programs", Computer Vision and Pattern Recognition (CVPR), 2018, arXiv.1806.07011v1, submitted Jun 2018, 9 pages.
Purushwalkam, S. et al. "Bounce and Learn: Modeling Scene Dynamics with Real-World Bounce", ICLR 2019, 22 pages.

\* cited by examiner

SYNTHETIC DATA GENERATION FOR TRAINING A MACHINE LEARNING MODEL FOR DYNAMIC OBJECT COMPOSITING IN SCENES

TECHNICAL FIELD

This application relates generally to augmenting images and videos with dynamic object compositing, and more specifically, to generating synthetic training data to train a machine learning model to automatically augment an image or video with a dynamic object.

BACKGROUND

Within the past few years augmented reality and virtual reality systems have become more prevalent in society. While the demand for augmented and virtual reality increases so does the need for augmented and virtual reality systems to be produced in an efficient manner. Current virtual and augmented reality systems may rely heavily on developer input. For example, many augmented reality environments may be created by a developer coding the augmented reality environment in a frame by frame manner. However, such a process may be very time consuming. What is needed is a system that may require less developer manpower and instead harness various computational technologies such as machine learning.

BRIEF SUMMARY

Systems, methods, and apparatuses are provided for generating synthetic training data to train a machine learning model to automatically augment an image or video with a dynamic object. I one embodiment, a method may comprise receiving a first model comprising a representation of a first environment. The method may further comprise receiving a first viewpoint associated with the first model. The first viewpoint may be a viewpoint associated with a first virtual camera. The method may further comprise rendering, from the first viewpoint, a depth map of the first model. The method may further comprise rendering, from the first viewpoint, a surface normal map of the first model. The method may further comprise receiving a first dynamic object data associated with a first dynamic object. The method may further comprise simulating within the first model, from the first viewpoint, the first dynamic object moving away from the first virtual camera at a first initial velocity to generate first synthetic training data comprising a sequence of video frames depicting a simulation of the dynamic object interacting in a virtual environment. The method may further comprise training, based on the first synthetic training data, a first machine learning model. The method may further comprise receiving an image comprising a representation of a second environment. The second environment may be different from the first environment. The method may further comprise receiving, a second viewpoint associated with the image. The second viewpoint may be a viewpoint associated with a second virtual camera. The method may further comprise receiving a second dynamic object. The method may further comprise generating, based on the first machine learning model, a second initial velocity, and the second viewpoint, movement data of the second dynamic object within the second environment. The movement data may indicate at least a location of the second dynamic object within a plurality of frames. The method may further comprise superimposing, based on the movement data of the second dynamic object, the second dynamic object into the image.

In one embodiment, the method may further comprise receiving a third viewpoint associated with the first model. The third viewpoint may be associated with a third virtual camera and the third and first viewpoints are different. The method may further comprise simulating within the first model, from the third viewpoint, the first dynamic object moving away from the first virtual camera at the first initial velocity to generate a second video comprising the first dynamic object moving within the first model to generate second synthetic training data.

In one embodiment, the method may further comprise receiving a third model comprising a representation of a third environment. The method may further comprise receiving a fourth viewpoint associated with the third model. The fourth viewpoint may be a viewpoint associated with a fourth virtual camera. The method may further comprise rendering, from the fourth viewpoint, a depth normal map of the third model. The method may further comprise rendering, from the fourth viewpoint, a surface normal map of the third model. The method may further comprise simulating within the third model, from the fourth viewpoint, the first dynamic object moving away from the fourth virtual camera at the first initial velocity to generate a third video comprising the first dynamic object moving within the third model to generate third synthetic training data.

In some embodiments, the first environment may be an indoor environment and the second environment may be a different indoor environment. In one embodiment, the first model may be a three-dimensional model. In one embodiment, the movement data may indicate the first dynamic object interacting with one or more scene objects within the first model.

In one embodiment, the method may further comprise receiving user gesture data associated with a first human gesture. The method may further comprise determining, based on the user gesture data, the second initial velocity.

BRIEF DESCRIPTION OF THE FIGURES

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Techniques disclosed herein relate generally to augmenting images and videos with dynamic object compositing. More specifically, some embodiments relate to generating synthetic training data to train a machine learning model to automatically augment an image or video with a dynamic object. Various embodiments are described herein, including methods, systems, non-transitory computer-readable storage media storing programs, code, or instructions executable by one or more processors, and the like.

One of many challenges in compositing realistic dynamic objects within a scene is the time it may take a developer to produce the composite dynamic object and/or the scene. For example, a developer may first take an image and then create a three dimensional (3D) model of the image then the developer may have to determine additional information associated with the 3D model of the image such as a depth map, planar map, and the like. Then in some instances, the trajectory and/or movement of the dynamic object may have to be manually determined in a plurality of frames. All of these steps may take a developer several hours to complete.

According to some aspects of the present disclosure, techniques for generating synthetic training data for training a machine learning model to automatically composite dynamic objects, such as a bouncing ball, into an image are disclosed. In one embodiment, a plurality of synthetic 3D models may be retrieved by a computer system. These synthetic 3D models may be 3D representations of, for example, indoor environments. The synthetic 3D models may be computer aided design (CAD) models that are made available by SUN-RGBD or another 3D CAD model database. In one embodiment, a first viewpoint may be identified within the retrieved synthetic 3D model. From the first viewpoint, a depth normal map and a surface normal map be rendered of the synthetic 3D model by the computer system.

In one or more embodiments, a dynamic object is received by the computer system. The dynamic object may be, for example, a bouncing ball, a teddy bear, a soccer ball, a football or any other dynamic object that is capable of interacting with scene objects within the synthetic 3D model. Scene objects within a synthetic 3D model may be stationary objects such as a wall, a shelf, a couch, and the like. Scene objects within a synthetic 3D model may be non-stationary objects such as a human beings or animals. In one embodiment, the computer system may simulate, from the first viewpoint, the dynamic object moving away from a virtual camera associated with the first viewpoint within the synthetic 3D model. In one embodiment, the simulation may be aided by a physics simulator, such as, PyBullet. The simulation may determine several data points associated with the movement of the dynamic object within the synthetic 3D environment at different times (e.g., within different frames). These data points may be the synthetic training data used to train a machine learning model.

The process for obtaining synthetic training data may be repeated for multiple viewpoints within a synthetic 3D model. In addition, the process for obtaining synthetic training data may further be repeated for different synthetic 3D models. By obtaining synthetic training data associated with multiple viewpoints from multiple synthetic 3D models the synthetic training data may comprise a plurality of data points related to the movement of a dynamic object within a multitude of 3D environments. The synthetic training data may be utilized by a machine learning algorithm (or a neural network) in order to automatically and accurately composite new dynamic objects in a new image.

The techniques disclosed herein may be used to superimpose dynamic objects into images, augmented reality environments, and/or virtual reality environment based upon machine learning algorithms that utilize synthetic training data. The techniques disclosed herein may be an improvement to photorealistic imaging, image processing, virtual reality environments, and/or augmented reality environments by automatically, for new images, compositing dynamic objects within the new images.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

Figure 1:
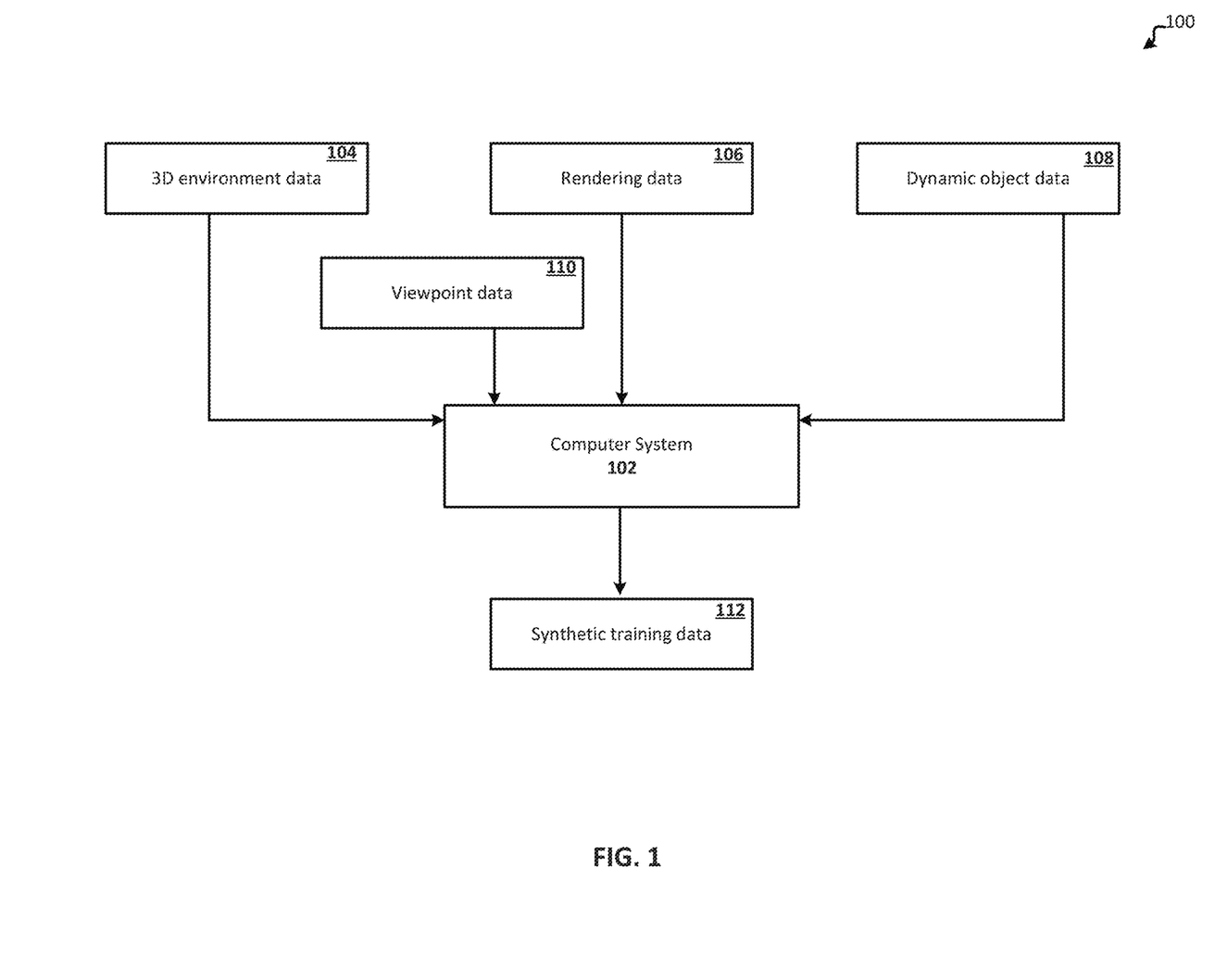
FIG. 1 illustrates an example of system for generating synthetic training data to train a machine learning model.

FIG. 1 illustrates an example of system 100 for generating synthetic training data to train a machine learning model. System 100 comprises of computer system 102 and a plurality of inputs to computer system 102 and an output from computer system 102. The inputs include 3D environment data 104, rendering data 106, dynamic object data 108, viewpoint data 110. The output may include synthetic training data 112. Computer system 102 may be implemented by one or more processors and one or more associated non-volatile memories. A machine learning model may be trained (based on various inputs) to determine, for a previously not received photograph or image, the location of a dynamic object within the photograph or image at a plurality of times. In addition, the machine learning model may be trained to determine, for a previously not received photograph or image, one or more interactions between a dynamic object and a scene object within the photograph or image. For example, a dynamic object such as a ball may appear to bouncing with an image and collide with a water bottle within an image. The machine learning model may not only determine a movement of the bouncing ball, but also the movement of the water bottle based on the collision with the bouncing ball.

3D environment data 104 may be data associated with a 3D environment. In one embodiment, 3D environment data 104 may comprise a synthetic 3D model. The synthetic 3D model may be a 3D representation of an indoor environment such as a room, a kitchen, a bedroom, an office, an arena, a study, a bathroom, a garage, and the like. The synthetic 3D model may be a CAD model that is made available by SUN-RGBD or another image database. 3D environment data 104 may include surface data associated with one or more scene objects within the 3D environment. A scene object may be any object that is part of the 3D environment. For example, there may be surface data associated with one or more scene objects within the 3D environment. In such an example, a wall (e.g., a scene object within the 3D environment) may have a rigid or flat surface. The surface type may be indicated by surface data. In addition, the material make up of a scene object may also be included in 3D environment data as surface data. For example, a couch (e.g., a scene object within the 3D environment) may be made of leather or some other material. This material make up may be indicated in surface data associated with the couch. Surface data may be important in determining a coefficient of friction and/or a coefficient of restitution between a dynamic object and a scene object within the 3D environment.

Rendering data 106 may comprise a depth map and/or a surface normal map of a 3D environment that may be used to render the 3D environment. In one embodiment, a rendered 3D environment, may be generated by rendering the 3D environment associated with 3D environment data 104. A depth map may be an image that contains information relating the distance of the surfaces of scene objects from a particular viewpoint. In one embodiment, a depth map may show luminance in proportion to the distance from a virtual camera associated with a particular viewpoint. In such an embodiment, nearer surfaces may be darker and further surfaces may be lighter. In one embodiment, a depth map may show luminance in relation to the distances from a nominal focal plane. In such an embodiment, surfaces closer to the focal plane are darker and surfaces further from the focal plane are lighter. A depth map may be helpful in indicating scene objects within a 3D environment that may be hidden from view (from a particular viewpoint) and which may otherwise be ignored. A surface normal map may be an image that indicates surface normals for one or more pixels within a 3D environment. A surface normal may be a vector that is perpendicular to a tangent plane to a surface at a point. A surface normal map may be utilized to determine a scene objects orientation toward a light source (or viewpoint) for shading purposes. A surface normal map may aid in the lighting within a rendered 3D environment, which may allow the rendered 3D environment to appear more photorealistic.

Dynamic object data 108 may comprise data associated with a dynamic object. Dynamic object data 108 may comprise physical data associated with a dynamic object. In one embodiment, a dynamic object may be an object that moves within a 3D environment. A dynamic object may be different from a scene object in the sense that a dynamic object is not a part of the 3D environment, but instead a dynamic object is superimposed into the 3D environment and may interact with scene objects within the 3D environment. For example, a 3D environment may be a bathroom and scene objects within the bathroom may be a toilet and a shower. In such an example, a dynamic object may be a ball that bounces within the bathroom. Physical data associated with the dynamic object may be data indicating a material make-up of the dynamic object, a weight of the dynamic object, an initial velocity of the dynamic object, an initial direction of the dynamic object and the like. The physical data associated with the dynamic object may be used to determine a coefficient of friction and/or a coefficient of restitution between a dynamic object and a scene object within the 3D environment and/or to determine, via a physics simulator, the location of the dynamic object within a 3D environment at a plurality of different times.

Viewpoint data 110 may comprise data associated with a virtual camera within a 3D environment. Within a 3D environment there may be a first viewpoint through which the 3D environment is viewed. The viewpoint may be associated with a virtual camera. The virtual camera may function and behave in a similar way to how a camera or digital camera would in real-world situations. For example, a first viewpoint within a 3D environment may be a viewpoint as seen through the lens of a virtual camera at a first location according a first angle of the virtual camera. Viewpoint data 110 may include data indicating the location and the angle of a virtual camera associated with a viewpoint.

Computer system 102 may, based on one or more inputs, generate synthetic training data 112. Computer system 102 may take 3D environment data 104, rendering data 106, dynamic object data 108, and/or viewpoint data 110 and simulate a dynamic object moving away from a particular viewpoint within a 3D environment to generate synthetic training data 112. In one embodiment, the dynamic object may interact with one or more scene objects within the 3D environment. In one embodiment, computer system 102 may implement a physics simulator, such as PyBullet, to simulate the dynamic object within the 3D environment. A physics simulator may take into account the physical data associated with the dynamic object as well as the surface data associated with scene objects within the 3D environment to determine the dynamic object's location within the 3D environment at different times. In one embodiment, synthetic training data 112 may comprise a plurality of videos, from different viewpoints, within a 3D environment depicting interactions (between the dynamic object and scene objects), surface normals, and depth maps of the 3D environment. In one embodiment, synthetic training data 112 may also comprise a plurality of videos from different 3D environments and different viewpoints within those different 3D environments depicting interactions (between the dynamic object and scene objects), surface normals, and depth maps of the different 3D environments from different viewpoints. In this way, computer system 102 may generate synthetic training data 112 that contains many hundreds, thousands, or millions of interactions, surface normals, and depth maps spanning many different 3D environments and viewpoints. In one embodiment, synthetic training data 112 may be referred to as video data. Synthetic training data 112 may be then used to train a machine learning model to composite dynamic objects into images and/or environments.

Figure 2A:
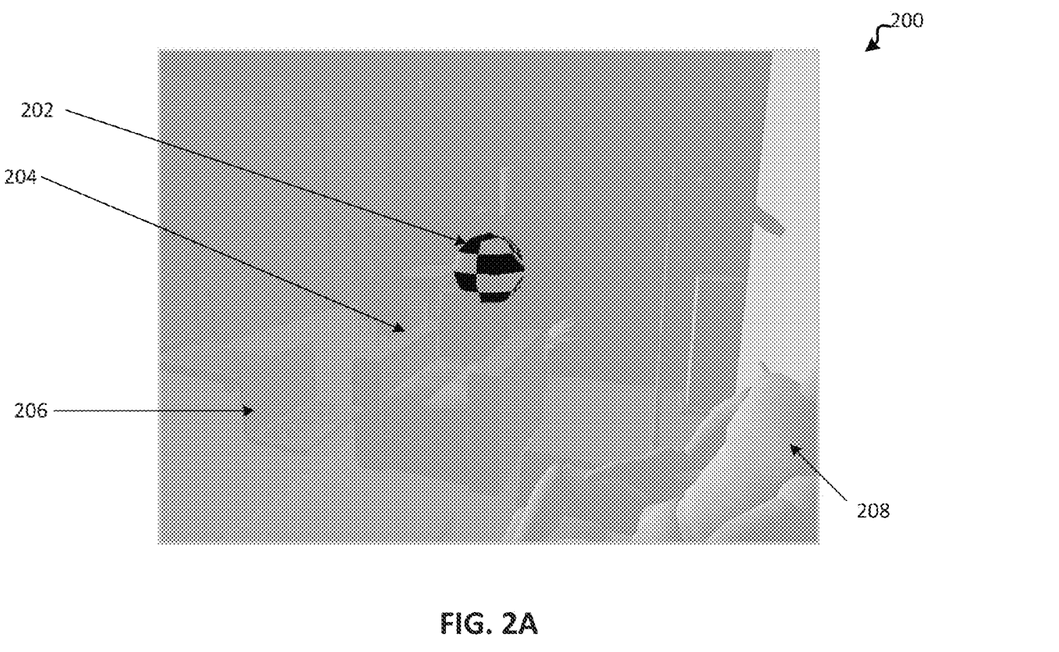
FIG. 2A illustrates a first rendered 3D environment for generating synthetic training data.

FIGS. 2A-2E illustrate a rendered 3D environment 200 for generating synthetic training data. FIG. 2A depicts rendered 3D environment 200 and dynamic object 202 at a first time from a first view. Rendered 3D environment 200 may be a living room within home. Rendered 3D environment 200 may comprise a plurality of scene objects such as chair 204, laptop 206, and human being 208. In one embodiment, each scene object may be stationary. In one embodiment, one or more scene objects, such as human being 208, may be non-stationary.

Figure 2B:
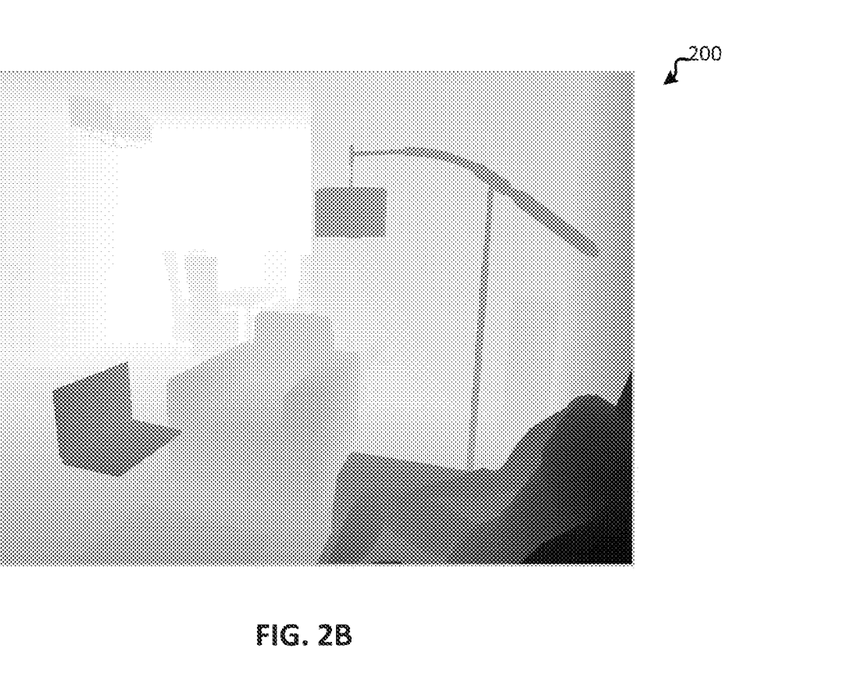
FIG. 2B illustrates a second rendered 3D environment for generating synthetic training data.

FIG. 2B illustrates a depth map of rendered 3D environment 200 at a first time without a dynamic object. The depth map indicates, via luminance, a plurality of scene objects within rendered 3D environment 200. As indicated in FIG. 2B, scene objects closer to the virtual camera associated with the first viewpoint appear darker than scene objects further away from the virtual camera.

Figure 2C:
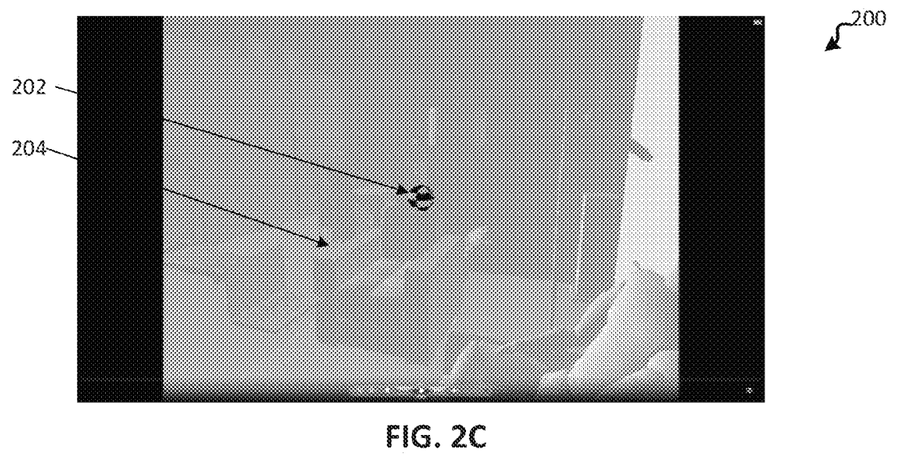
FIG. 2C illustrates a third rendered 3D environment for generating synthetic training data.

FIG. 2C illustrates rendered 3D environment 200 at a second time. At the second time, dynamic object 202 is moving away from the virtual camera associated with the first viewpoint. In one embodiment, the trajectory and direction of dynamic object 202 may be determined by a physics simulation based on physical data associated with dynamic object 202. In one embodiment, the physics simulation may simulate the trajectory and interactions of a ball that appears to be thrown from the virtual camera associated with the first viewpoint. In FIG. 2C, dynamic object 202 may have initial trajectory towards chair 204. The second time may be a time that proceeds the first time. As a result, FIG. 2C illustrates a rendered environment after FIG. 2A.

Figure 2D:
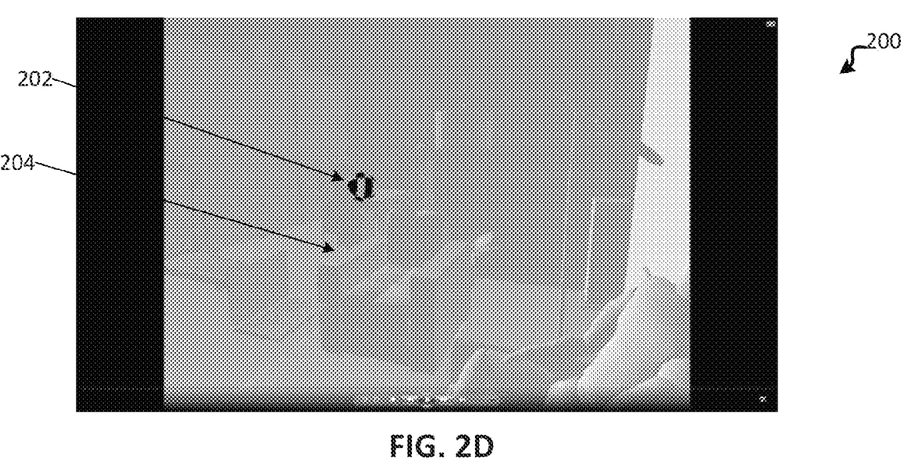
FIG. 2D illustrates a fourth rendered 3D environment for generating synthetic training data.

FIG. 2D illustrates rendered 3D environment 200 at a third time. At the third time, dynamic object 202 has interacted with chair 204. The interaction between dynamic object 202 and chair 204 may cause dynamic object 202 to appear to bounce off of chair 204. In one embodiment, the bounce trajectory and direction of dynamic object 202 after interacting with chair 204 may be determined by a physics simulation based on physical data associated with dynamic object 202 and surface data associated with chair 204. For example, the physics simulation may generate a coefficient of friction and/or a coefficient of restitution between dynamic object 202 and chair 204. The coefficient of friction and/or coefficient of restitution along with the initial velocity and direction of dynamic object 202 may be used by a physics simulator to simulate the trajectory and direction of dynamic object 202 and chair 204 at the third time. In one embodiment, depending upon the physical data associated with dynamic object 202 and surface data associated with chair 204, chair 204 may be displaced from its original position. For example, if the physical data associated with dynamic object 202 indicates dynamic object 202 was moving at a high velocity and is of a certain weight and that surface data associated with chair 204 indicates chair 204 was constructed of a certain material, had a particular type of surface, and a particular weight, then the collision between dynamic object 202 and chair 204 may displace chair 204 for its original position (e.g., the position of chair 204 at a time prior to the third time).

Figure 2E:
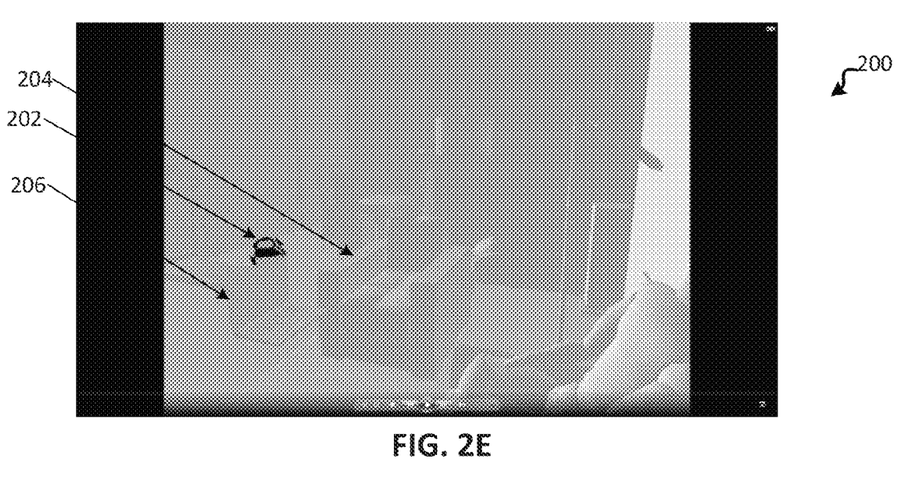
FIG. 2E illustrates a fifth rendered 3D environment for generating synthetic training data.

FIG. 2E illustrates rendered 3D environment 200 at a fourth time. At the fourth time, dynamic object 202 has continued on a bounce trajectory after interacting with chair 204. Dynamic object 202 appears to located behind laptop 206 based upon the first viewpoint. FIGS. 2A-2E together may be part of synthetic training data for a machine learning model. FIGS. 2A-2E may indicate various data points at different times within the rendered 3D environment. For example, various data points may include: surface normals with a plurality of pixels within the environment at different times; depth maps associated with the environment at different times; trajectory, location, spin, and rotation of a dynamic object at different times based upon physical data associated with the dynamic object; displacement of one or more scene objects as a result of an interaction between the dynamic object and one or more scene objects at different times, and the like. These various data points may be part of synthetic training data for a machine learning model in order to train the machine learning model to composite dynamic objects within an environment.

Figure 3A:
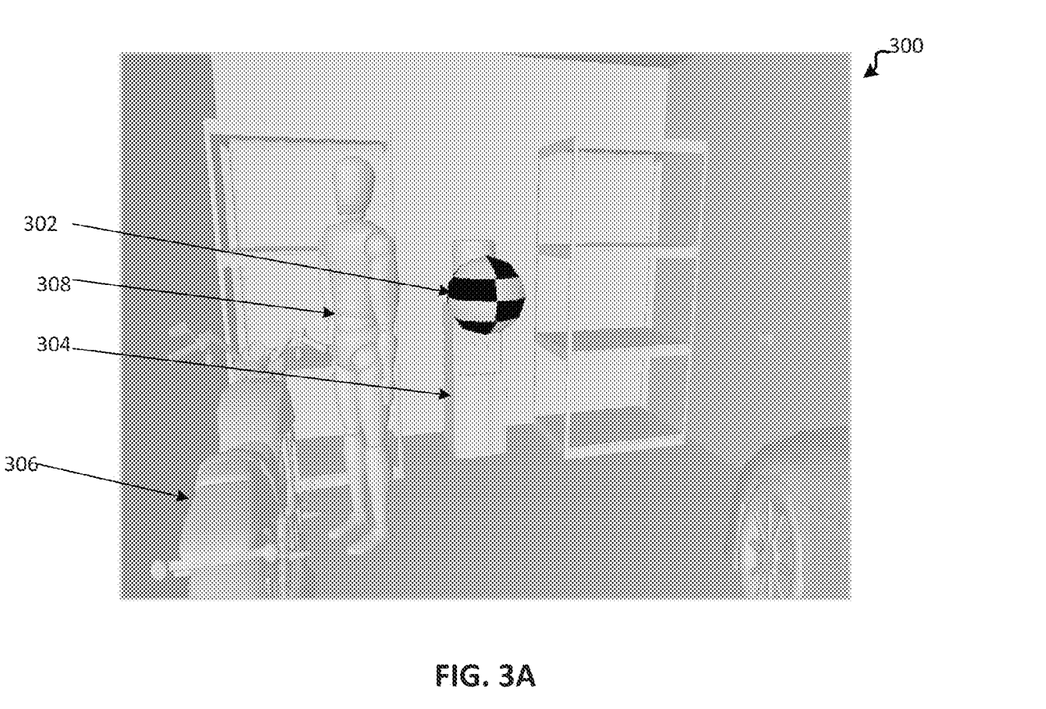
FIG. 3A illustrates a sixth rendered 3D environment for generating synthetic training data.

FIGS. 3A-3E illustrate a rendered 3D environment 300 for generating synthetic training data. FIG. 3A depicts rendered 3D environment 300 and dynamic object 302 at a first time from a first viewpoint. Rendered 3D environment 300 may be a garage. Rendered 3D environment 300 may comprise a plurality of scene objects such as water cooler 304, bike 306, and human being 308. In one embodiment, each scene object may be stationary. In one embodiment, one or more scene objects, such as human being 308, may be non-stationary.

Figure 3B:
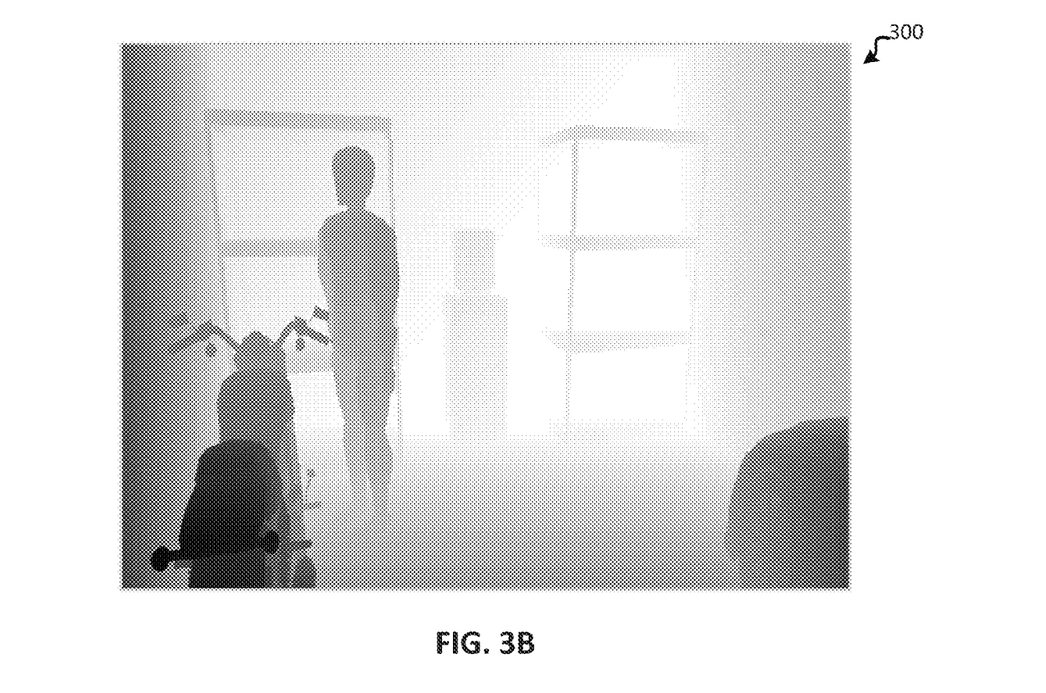
FIG. 3B illustrates a seventh rendered 3D environment for generating synthetic training data.

FIG. 3B illustrates a depth map of 3D environment 300 at a first time without a dynamic object. The depth map indicates, via luminance, a plurality of scene objects within rendered 3D environment 300. As indicated in FIG. 3B scene objects closer to the virtual camera associated with the first viewpoint appear darker than scene objects further away from the virtual camera.

Figure 3C:
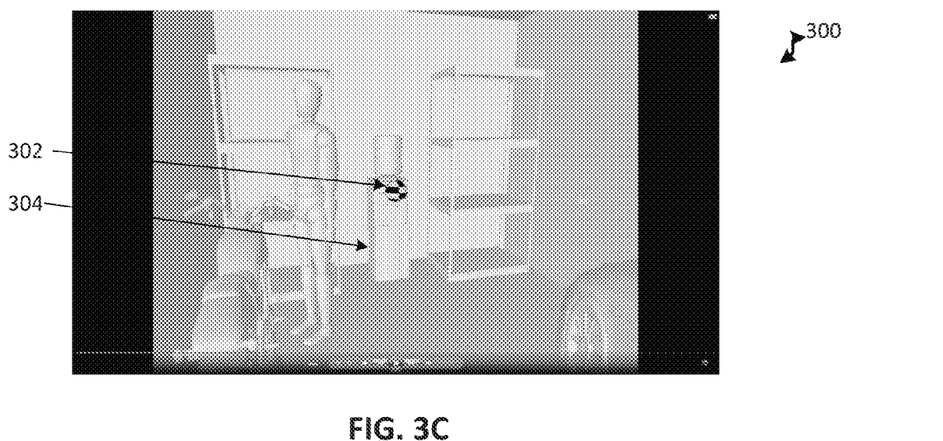
FIG. 3C illustrates a eighth rendered 3D environment for generating synthetic training data.

FIG. 3C illustrates rendered 3D environment 300 at a second time. At the second time, dynamic object 302 is moving away from the virtual camera associated with the first viewpoint. In one embodiment, the trajectory and direction of dynamic object 302 may be determined by a physics simulator based on physical data associated with dynamic object 302. In one embodiment, the physics simulator may simulate the trajectory and interactions of a ball that appears to be thrown from the virtual camera associated with the first viewpoint. In FIG. 2C, dynamic object 302 may have an initial trajectory towards water cooler 204. As depicted in FIG. 3C dynamic object 302 appears to be, from the first viewpoint, smaller than dynamic object 302 in FIG. 3A. The smaller appearance of dynamic object 302 indicates dynamic object 302 is moving away from the virtual camera associated with the first viewpoint. The second time may be a time that proceeds the first time. As a result, FIG. 3C illustrates a rendered environment after FIG. 3A.

Figure 3D:
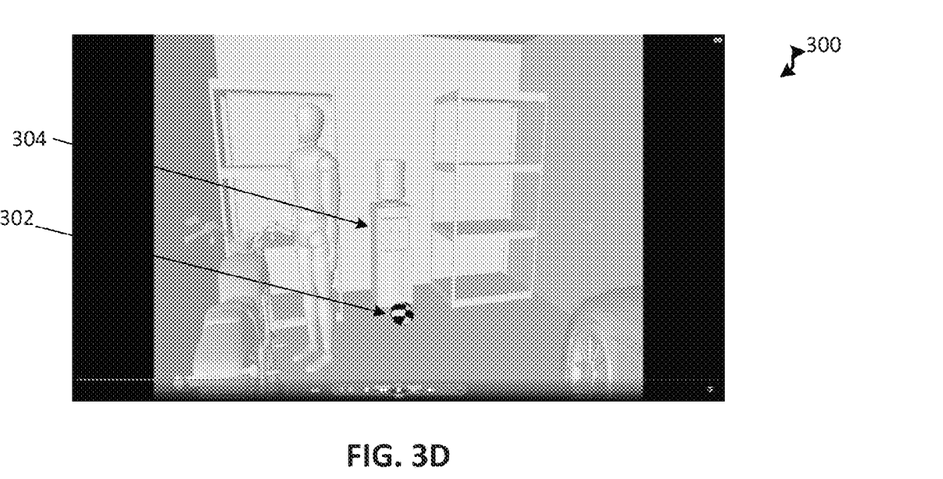
FIG. 3D illustrates a ninth rendered 3D environment for generating synthetic training data.

FIG. 3D illustrates rendered 3D environment 300 at a third time. At the third time, dynamic object 302 has interacted with water cooler 304. The interaction between dynamic object 302 and water cooler 304 may cause dynamic object 302 to appear to bounce off of water cooler 304. In one embodiment, the bounce trajectory and direction of dynamic object 302 after interacting with water cooler 304 may be determined by a physics simulation based on physical data associated with dynamic object 302 and surface data associated with water cooler 304. For example, the physics simulation may generate a coefficient of friction and/or a coefficient of restitution between dynamic object 302 and water cooler 304. The coefficient of friction and/or coefficient of restitution along with the initial velocity and direction of dynamic object 302 may be used by a physics simulator to simulate the trajectory and direction of dynamic object 302 and water cooler 304 at the third time. In one embodiment, depending upon the physical data associated with dynamic object 302 and surface data associated with water cooler 304, water cooler 304 may be displaced from its original position (i.e., the position of water cooler 304 at a first time).

Figure 3E:
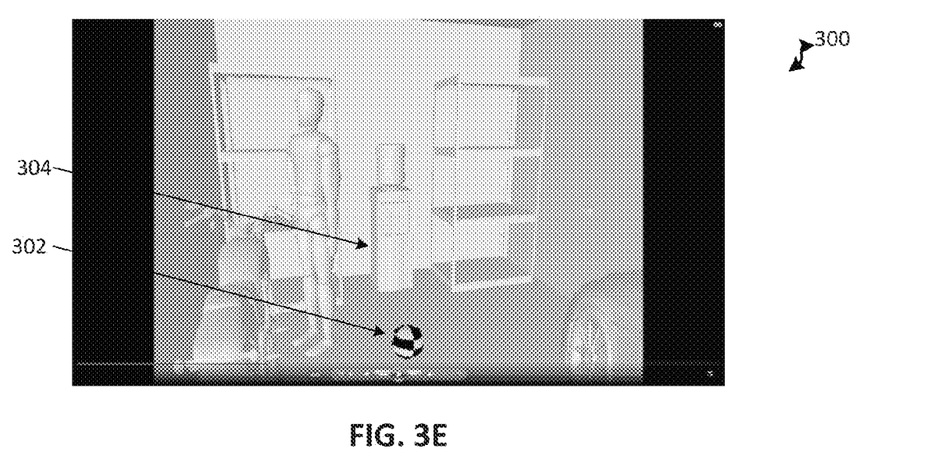
FIG. 3E illustrates a tenth rendered 3D environment for generating synthetic training data.

FIG. 3E illustrates rendered 3D environment 300 at a fourth time. At the fourth time, dynamic object 302 has continued on a bounce trajectory after interacting with water cooler 304. Dynamic object 302 appears to be returning to the virtual camera associated with the viewpoint. FIGS. 2A-2E along with FIGS. 3A-3E may all be part of synthetic training data for a machine learning model. By simulating the motion of a dynamic object within a plurality of different environments from a plurality of viewpoints, synthetic training data may be generated. By incorporating the synthetic training data, a machine learning model may be able to accurately composite dynamic objects into new environments. A new environment may be photographs, 3D models, 2D models, virtual reality environments and/or augmented reality environments that are not exactly indicated in the synthetic training data. Utilizing a machine learning model trained by the synthetic training data may save developers time when superimposing dynamic objects into photographs, 3D models, 2D models, virtual reality environments and/or augmented reality environments.

Figure 4A:
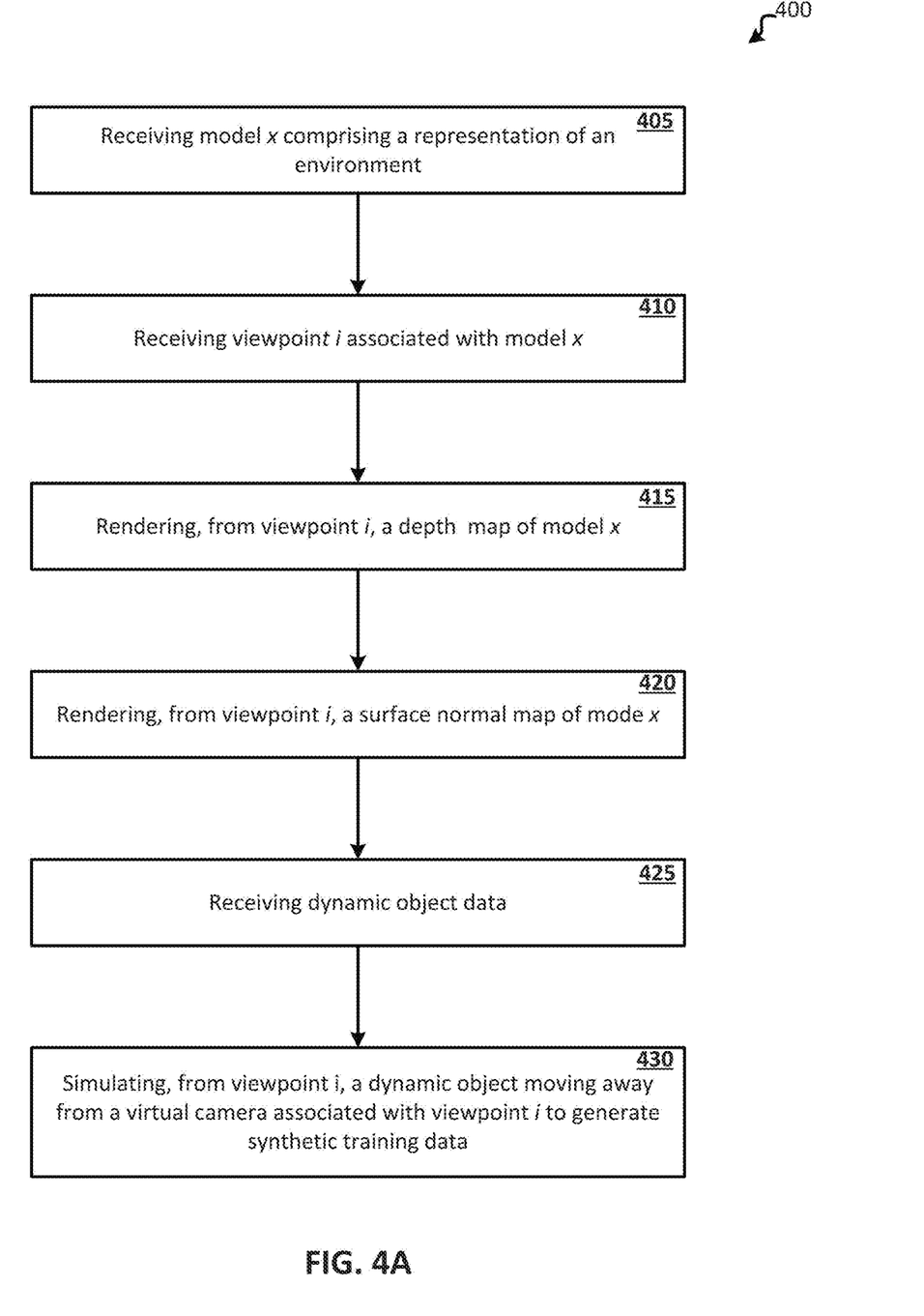
FIG. 4A illustrates an example process in accordance with one or more embodiments.
Figure 4B:
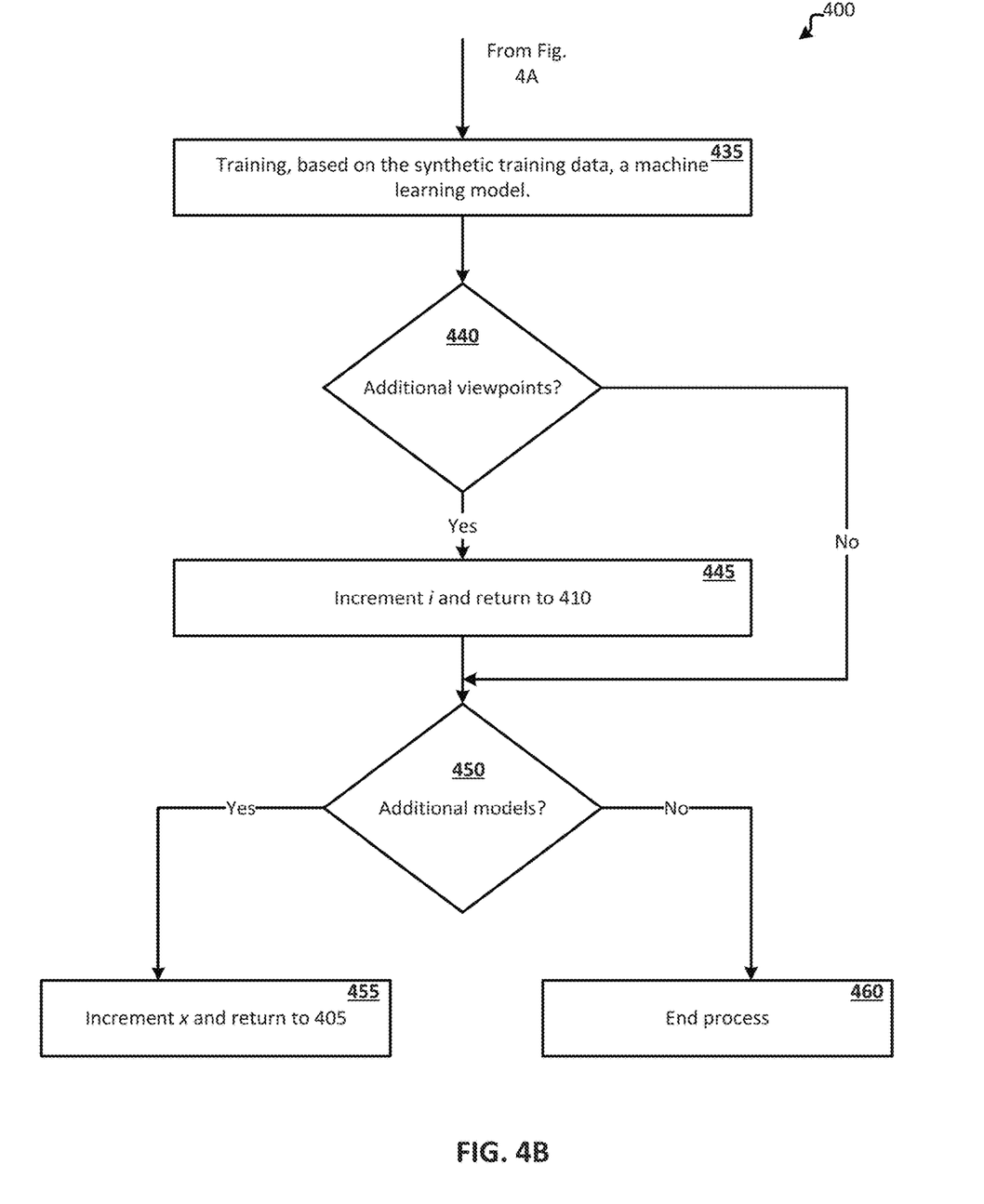
FIG. 4B illustrates an example process in accordance with one or more embodiments.

FIGS. 4A-4B depict process 400 for generating synthetic training data and using the generated synthetic training data to train a machine learning model. One or more aspects of process 400 may be performed by a computer system. At 405, a computer system receives model x comprising representation of an environment. Process 400 may perform multiple iterations in which several models will be utilized. The x may represent a variable that may change with each respective iteration. For sake of simplicity, the foregoing description may describe a first iteration and a first model. The first model may be a synthetic 3D model. The synthetic 3D model may be a 3D representation of an indoor environment such as a room, a kitchen, a bedroom, an office, an arena, a study, a bathroom, a garage, and the like. The synthetic 3D model may be a CAD model that is made available by SUN-RGBD or another image database. The first model may include data associated with one or more scene objects within the first model.

At 410, the computer system receives viewpoint i associated with the first model. Process 400 may perform multiple iterations in which several viewpoints associated with one or more models may be utilized. The i may represent a variable that may change with each respective iteration. For sake of simplicity, the foregoing description may describe a first iteration and a first viewpoint. The first viewpoint may comprise data associated with a virtual camera within the first model. Within the first model, the first viewpoint may be a point of view through which the first model is viewed. The first viewpoint may be associated with a virtual camera. For example, the first viewpoint within the first environment may be a viewpoint as seen through the lens of a virtual camera at a first location according to data indicating the first location and a first angle of the virtual camera.

At 415, the computer system renders, from the first viewpoint, a depth map of the first model. A depth map may be an image that contains information relating the distance of the surfaces of scene objects within the first model from a particular viewpoint. The computer system may use a rendering engine to render the depth map of the first model from the first viewpoint.

At 420, the computer system renders, from the first viewpoint, a surface normal map of the first model. A surface normal map may be an image that indicates surface normals for one or more pixels within the first model. A surface normal may be a vector that is perpendicular to a tangent plane to a surface at a point. A surface normal map may be utilized to determine a scene objects orientation toward a light source (or viewpoint) for shading purposes.

At 425, the computer system receives dynamic object data. Dynamic object data may comprise physical data associated with a dynamic object. In one embodiment, a dynamic object may be an object that moves within a model. A dynamic object may be different from a scene object in the sense that a dynamic object is not a part of the model, but instead a dynamic object is superimposed into the model and may interact with scene objects within the model. For example, a first model may be a garden and scene objects within the garden may be plants and tools. In such an example, a dynamic object may be a ball that bounces within the garden.

At 430, the computer system simulates, from the first viewpoint, a dynamic object moving away from a virtual camera associated with the first viewpoint to generate synthetic training data. The computer system may implement a physics simulator to simulate the movement of the dynamic object, from the first viewpoint, within the first model. A physics simulator may take into account the physical data associated with the dynamic object as well as the surface data associated with scene objects within the first model to determine the dynamic object's location within the first model at different times. The simulation may be within a rendered first model and may be for a certain duration (e.g., 5 seconds, 10 sections, 15 seconds, and the like). In one embodiment one or more scene objects may remain stationary during the simulation, while the dynamic object is in motion. In one embodiment, one or more scene objects may be displaced from their original position either by the dynamic object or some other force (e.g., gravity). The result of the simulation may be a plurality of rendered frames. Each of these render frames may contain synthetic training data. The synthetic training data may comprise one or more of the following elements: surface normals, a depth map, dynamic object location, physical data associated with the dynamic object, one or more scene objects' location, one or more scene objects' displacement from an initial position, surface data associated with one or more scene objects, a coefficient of friction and/or a coefficient of restitution between the dynamic object and a scene object within the first model. Each of these elements may be indicated for each frame in the simulation. In one embodiment, the dynamic object may move in any initial direction with a specified initial velocity. For example, the dynamic object may move toward a virtual camera.

At 435, the computer system trains a machine learning model based on the synthetic training data. The machine learning model may comprise a plurality of machine learning models and algorithms. In one embodiment, the machine learning algorithm may be a supervised learning algorithm or an unsupervised learning algorithm. The machine learning algorithm may be a classification, regression, clustering, decision tree learning, association rule learning, artificial neural network, inductive logic programming machine learning algorithm, and the like.

At 440, the computer system determines if there are additional viewpoints associated with the first model for which additional synthetic training data may be generated. In one embodiment, synthetic training data may be generated for multiple viewpoints for a first model. If there are additional viewpoints associated with the first model then at 445, process 400, via the computer system, increments the viewpoint and returns to 410. By incrementing the viewpoint the first viewpoint becomes the second viewpoint, and a second viewpoint would become a third viewpoint and so forth. As a result, processes associated with 410-440 may be repeated for a second viewpoint within the first model. For example, a first viewpoint may be viewpoint from a corner of the first model and the second viewpoint may be a viewpoint from atop of the first model. By simulating a dynamic object from different viewpoints within the same model it may allow more data points (i.e. more synthetic training data) for training the machine learning model. In one embodiment, by obtaining different viewpoints from within a model, the machine learning model may, upon receiving a new image with a new viewpoint, reference a similar viewpoint in a similar environment so as to better determine a composite dynamic object within the new image from the new viewpoint.

At 440, if the computer system determines there are no additional viewpoints associated with the first model then process 400 moves to 450. At 450, the computer system determines if there are additional models for which additional synthetic training data may be generated. In one embodiment, synthetic training data may be generated for multiple models. For example, there may be a plurality (e.g., hundreds or thousands) of publicly available models. These models may be used to simulate dynamic objects within the models. Similar to the additional viewpoints within models, additional models may generate several times more data points for training the machine learning model. If there are additional models then at 455, process 400, via the computer system, increments the model and returns to 405. By incrementing the model the first model becomes the second model, and a second model would become a third model and so forth. As a result, processes associated with 405-450 may be repeated for a second model. For example, a first model may be a 3D representation of a bedroom and the second model may be a 3D representation of bathroom. In another example, the first model may be a 3D representation of a first type of bedroom (e.g., a child's bedroom) and the second model may be a 3D representation of a second type of a bedroom (e.g., an adults bedroom). In one embodiment, by obtaining different models and viewpoints within those models for composite dynamic objects, the machine learning model may, upon receiving a new image with a new viewpoint reference a similar viewpoint in a similar model so as to better determine a composite dynamic object within a new image from the new viewpoint.

At 450, if the computer system determines there are no additional models then process 400 moves to 460 and process 400 ends.

Figure 5:
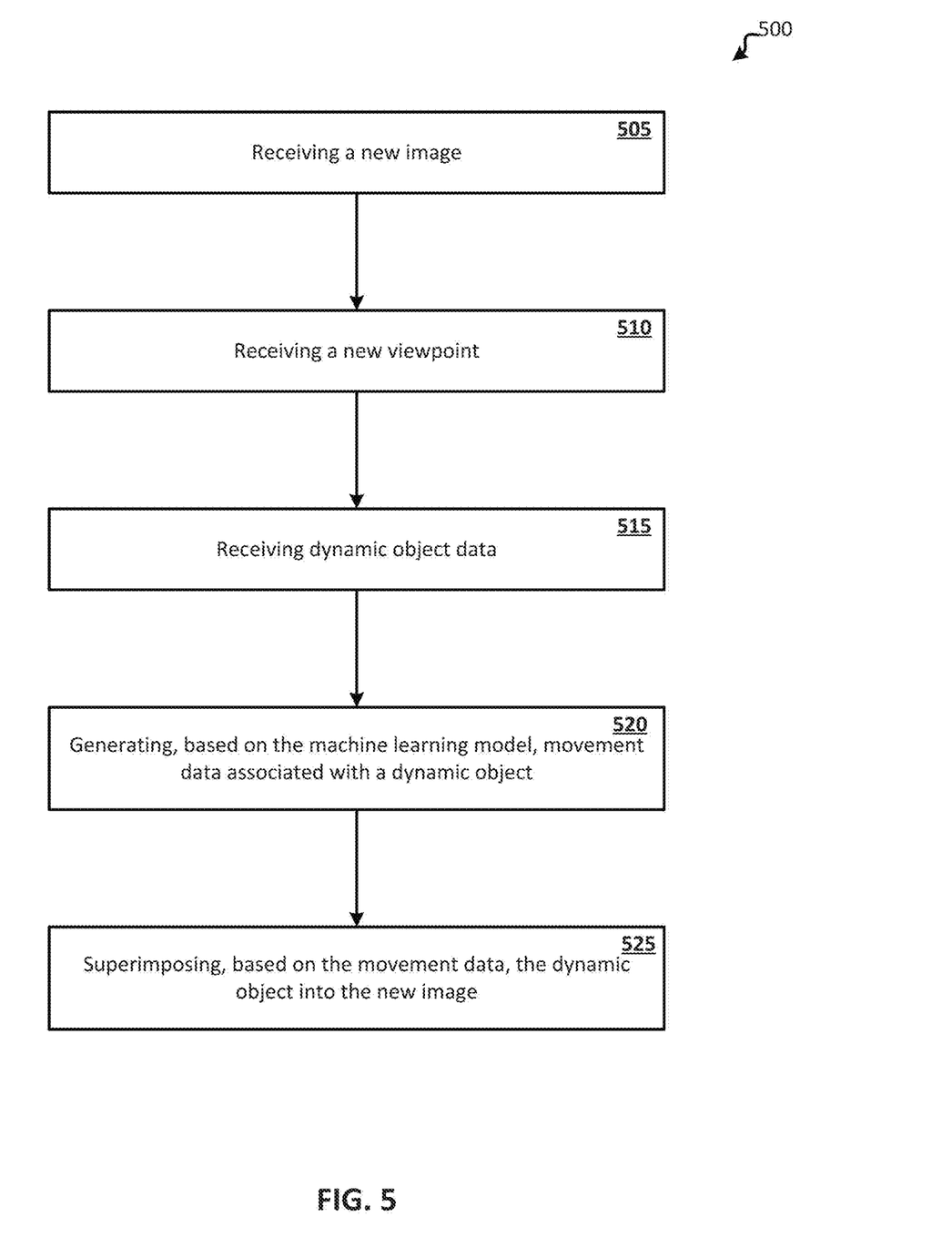
FIG. 5 illustrates an example process in accordance with one or more embodiments.

FIG. 5 illustrates process 500 for superimposing a dynamic object within a new image from a new viewpoint. One or more aspects of process 500 may be performed by a computer system. At 505, the computer system receives a new image. The computer system may be running one or more machine learning models that has been trained by synthetic training data. The synthetic training data may be based upon one or more models and one or more viewpoints within those models. A new image may be a photograph of a scene. In such an instance, the computer system may, by utilizing a machine learning model trained by synthetic training data, construct a 3D model from the photograph. For example, the photograph may be of a bedroom and the machine learning model may be trained by synthetic training data containing a plurality of data points associated with 3D models of bedrooms. Based on the synthetic training data, the machine learning model may map certain aspects of the photograph to elements of previously received 3D models to construct (or generate) a 3D model representation of the photograph. In one embodiment, the new image may be a 3D model of an environment. In such an embodiment, the new image may not have been previously been a part of the synthetic training data. In one embodiment, the new image may be associated with the synthetic training data. In such an embodiment, for example, the new image may be a photograph or 3D model of an indoor scene and the synthetic training data may contain all or mostly all data points from indoor scenes. Once the new image is converted into a 3D model (or received as a 3D model) process 500 moves to 510.

At 510, the computer system receives a new viewpoint associated with the new model. The new viewpoint may comprise data associated with a virtual camera within the new image. Within the image, the new viewpoint may be a point of view through which the image was captured. In one embodiment, the new viewpoint may be associated with a virtual camera. For example, the new viewpoint within the new image may be a viewpoint as seen through the lens of a virtual camera at a first location according a first angle of the virtual camera.

At 515, the computer system receives dynamic object data. Dynamic object data may comprise physical data associated with a dynamic object. In one embodiment, a dynamic object may be an object that moves within a new image. A dynamic object may be different from a scene object in the sense that a dynamic object is not a part of the new image, but instead a dynamic object is superimposed into the new image and may interact with scene objects within the new image. The dynamic object may be a ball, a teddy bear, an advertisement, an icon, or any other virtual item. Dynamic object data may also comprise user gesture data associated with a dynamic object. User gesture data may be data that is received from an input device connected to the computer system. The input device may be an accelerometer, joystick, controller, mouse, motion sensors and the like. For example, user gesture data may be created by an accelerometer recording how fast and in what direction a user's hand is going. In such an example, the computer system may generate a virtual reality or augmented reality environment based on a photograph and a user may make gestures (with his hands, feet, and the like) to move a dynamic object in the virtual reality or augmented reality environment. An accelerometer and/or motion sensors associated with the computer system may capture data associated with the user gesture. This user gesture data may be implemented by the computer system to determine an initial velocity and/or direction of a dynamic object, which may be considered dynamic object data.

At 520, the computer system generates, based on the machine learning model, movement data associated with a dynamic object within the new image. The machine learning model may be trained with synthetic training data comprising a hundreds or thousands of data points from previous simulations. In one embodiment, the machine learning model may be neural network. The machine learning model may take as an input the dynamic object data, the new image, and the new viewpoint and determine a dynamic object's movements (e.g., trajectory and interactions) for multiple frames. In one embodiment, for each frame within a rendering, the movement data may indicate the dynamic object's location and/or one or more scene objects displacement. In one embodiment, user gesture data may be utilized to determine an initial velocity and direction of the dynamic object. With this information, the machine learning model may leverage past instances of similar initial velocities and directions to calculate a movement path of the dynamic object. In addition, the machine learning model may leverage past instances of models and viewpoints that are similar to the new image and new viewpoint to calculate how the movement path of the dynamic object would appear from the new viewpoint and how the movement path of the dynamic object may change when interacting with scene objects within the new image. Data points indicated in the synthetic training data may be utilized by the machine learning model in order to calculate or accurately predict the movement of the dynamic object at different frames within a rendered environment. The location of the dynamic object within each frame of a rendered environment may be indicated by movement data associated with the dynamic object.

At 525, the computer system superimposes, based on the movement data, the dynamic object into the new image. After determining the movement data, the computer system may render the dynamic object at locations specified by the movement data within each frame of the rendered new image. For example, a rendered new image may contain a dynamic object moving within the rendered new image. In such an example, a new image may be an image of a garage and the dynamic object may be a soccer ball. Movement data may indicate the location of the soccer ball within the garage at different times, so the soccer ball may appear to be, for example, bouncing within the garage for a set amount of time (e.g., 2 seconds, 4 seconds, 10 seconds, etc.) as a result of some user gesture (e.g., a user gestures a kicking motion). By leveraging several data points in prior simulations, a machine learning model may be trained to accurately depict a composite dynamic object within an image.

Figure 6:
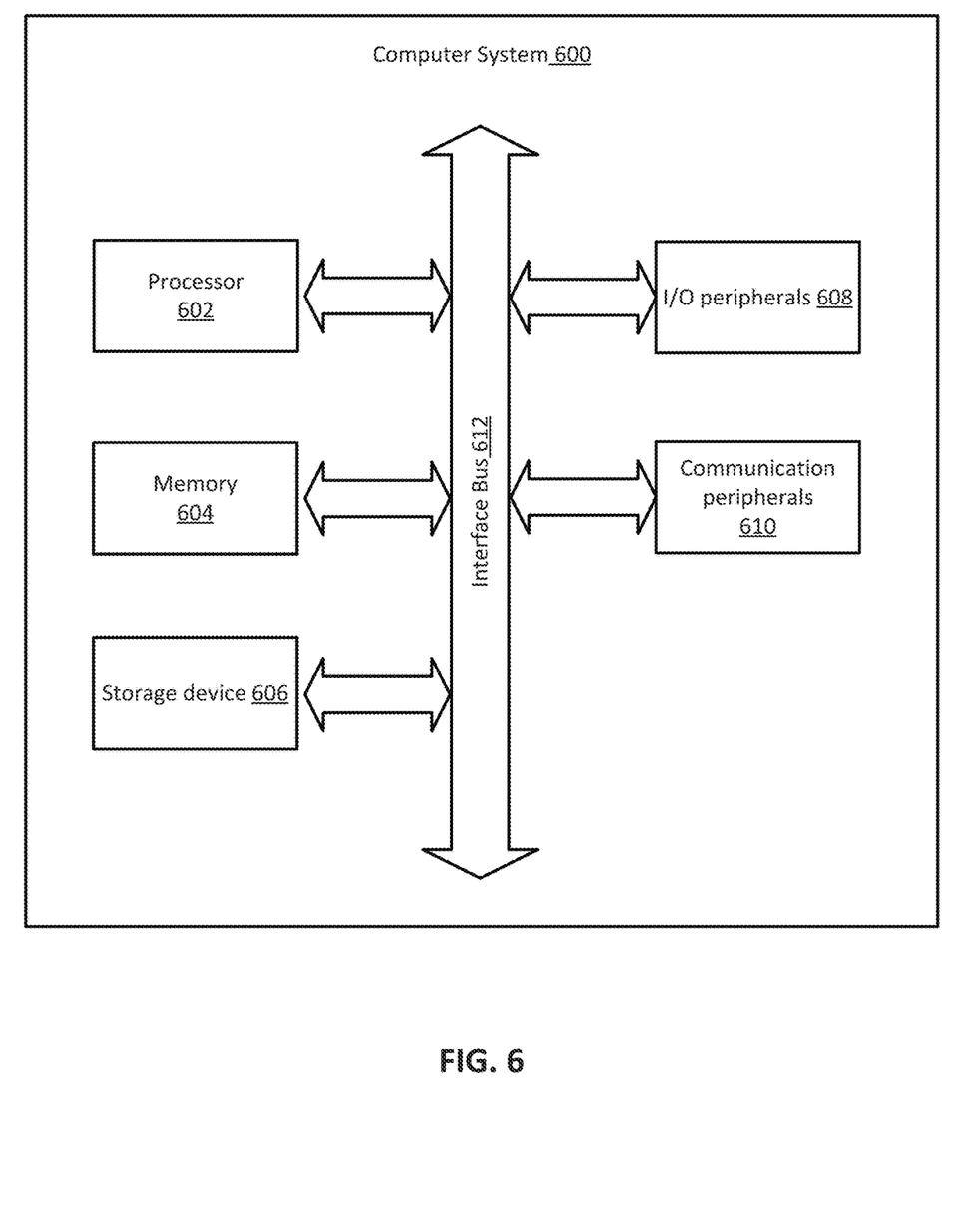
FIG. 6 illustrates an example computer system in accordance with one or more embodiments.

Any suitable computer system or group of computer systems can be used for performing the operations and processes described herein. For example, FIG. 6 depicts an example of the computer system 600. The implementation of computer system 600 could be used to perform one or more parts of processes 400 and/or 500. Computer system 102 in FIG. 1 may be implemented by computer system 600.

The depicted example of a computer system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

A memory device 604 includes any suitable non-transitory computer-readable medium for storing program code or program data. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

A storage device 606 includes additional store for computer system 600. In one embodiment, storage device 606 may be implemented by a hard drive disk and/or a steady state drive. In one embodiment storage device 606 may store one or more sets of synthetic training data and machine learning models.

The computer system 600 may also include a number of external or internal devices, such as a monitor, keyboard, mouse, or other input or output devices. For example, computer system 600 is shown with one or more input/output ("I/O") peripheral 608. An I/O peripheral 608 can receive input from input devices or provide output to output devices. One or more buses 612 are also included in the computer system 600. The bus 612 communicatively couples one or more components of a respective one of the computer system 600.

In some embodiments, the computer system 600 also includes a network communications peripherals 610. The network communications peripherals 610 includes any device or group of devices suitable for establishing a wired or wireless data connection to one or more data networks. Non-limiting examples of the network communications peripherals 610 include an Ethernet network adapter, a modem, and/or the like. The computer system 600 is able to communicate with one or more other computer devices via a data network using network communications peripherals 610. For example, computer system 600 may receive one or more source images and/or target images via network communications peripherals 610.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computer," "calculating," "determining," and "identifying" or the like refer to actions or processes of a computer device, such as one or more computers or a similar electronic computer device or devices, that manipulate or transform data represented as physical electronic or magnetic quantities within memories, registers, or other information storage devices, transmission devices, or display devices of the computer platform.

The system or systems discussed herein are not limited to any particular hardware architecture or configuration. A computer device can include any suitable arrangement of components that provide a result conditioned on one or more inputs. Suitable computer devices include multi-purpose microprocessor-based computer systems accessing stored software that programs or configures the computer system from a general purpose computer apparatus to a specialized computer apparatus implementing one or more embodiments of the present subject matter. Any suitable programming, scripting, or other type of language or combinations of languages may be used to implement the teachings contained herein in software to be used in programming or configuring a computer device.

Embodiments of the methods disclosed herein may be performed in the operation of such computer devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A non-transitory computer-readable storage medium having stored thereon instructions for causing at least one computer system to generate synthetic training data for dynamic object compositing, the instructions comprising:

receiving a first model comprising a representation of a first environment and a first viewpoint associated with the first model;

performing a simulation, within the first model and from the first viewpoint of a first dynamic object that is moving away from a virtual camera at a first initial velocity and a contact between a first scene object and the first dynamic object within the first model;

generating first synthetic training data comprising a sequence of video frames depicting the simulation of the first dynamic object, wherein the sequence of video frames includes a change in movement of at least one of the first dynamic object or the first scene object resulting from the contact;

training, based on the first synthetic training data, a machine learning model to simulate changes in movement of dynamic objects resulting from contact with scene objects;

generating movement data of a second dynamic object within a second environment by, at least, applying the trained machine learning model to a second initial velocity and a second viewpoint associated with an image in the second environment; and superimposing, based on the movement data of the second dynamic object, the second dynamic object into the image.

2. The computer-readable storage medium of claim 1, wherein the virtual camera is a first virtual camera, and the instructions further comprising:

rendering, from the first viewpoint, a depth map and a surface normal map of the first model; and receiving, the second viewpoint associated with the image from a second virtual camera.

3. The computer-readable storage medium of claim 2, wherein the depth map comprises environmental information that includes a relative distance between the first dynamic object and a surface of the first scene object.

4. The computer-readable storage medium of claim 1, the instructions further comprising:

receiving a third viewpoint associated with the first model, wherein the third and first viewpoints are different; and simulating within the first model, from the third viewpoint, the first dynamic object moving to generate second synthetic training data.

5. The computer-readable storage medium of claim 1, the instructions further comprising:

receiving a third model comprising a representation of a third environment;

receiving a fourth viewpoint associated with the third model; and simulating within the third model, from the fourth viewpoint, the first dynamic object moving to generate third synthetic training data.

6. The computer-readable storage medium of claim 1, wherein the first model is a three-dimensional model.

7. The computer-readable storage medium of claim 1, wherein the movement data indicates the first dynamic object interacting with one or more scene objects within the first model.

8. The computer-readable storage medium of claim 1, the instructions further comprising:

receiving user gesture data associated with a first human gesture; and determining, based on the user gesture data, the second initial velocity.

9. The computer-readable storage medium of claim 1, wherein the simulation comprises a change in luminance of one or more surfaces in the first environment that is based on a change in a relative distance between the first dynamic object and the virtual camera during the movement of the first dynamic object.

10. The computer-readable storage medium of claim 9, wherein the change in luminance is based in part on a focal plane, and wherein the change in luminance of the one or more surfaces is based on a relative distance between the focal plane and the one or more surfaces.

11. A computer-implemented method for generating synthetic training data for dynamic object compositing, the method comprising:
  receiving a first model comprising a representation of a first environment and a first viewpoint associated with the first model;
  performing a simulation, within the first model and from the first viewpoint of a first dynamic object that is moving away from a virtual camera at a first initial velocity and a contact between a first scene object and the first dynamic object within the first model; and
  generating first synthetic training data comprising a sequence of video frames depicting the simulation of the first dynamic object, wherein the sequence of video frames includes a change in movement of at least one of the first dynamic object or the first scene object resulting from the contact.

12. The computer-implemented method of claim 11, further comprising:
  training, based on the first synthetic training data, a machine learning model to simulate changes in movement of dynamic objects resulting from contact with scene objects;
  receiving an image comprising a representation of a second environment, wherein the second environment is different from the first environment;
  receiving, a second viewpoint associated with the image;
  receiving a second dynamic object data associated with a second dynamic object;
  generating movement data of the second dynamic object within the second environment by, at least, applying the trained machine learning model to a second initial velocity and the second viewpoint; and
  superimposing, based on the movement data of the second dynamic object, the second dynamic object into the image.

13. The computer-implemented method of claim 12, further comprising:
  receiving a third viewpoint associated with the first model, wherein the third and first viewpoints are different; and
  simulating within the first model, from the third viewpoint, the first dynamic object moving to generate second synthetic training data.

14. The computer-implemented method of claim 12, further comprising:
  receiving a third model comprising a representation of a third environment;
  receiving a fourth viewpoint associated with the third model; and
  simulating within the third model, from the fourth viewpoint, the first dynamic object moving to generate third synthetic training data.

15. The computer-implemented method of claim 12, wherein the first model is a three-dimensional model.

16. A system for generating synthetic training data for dynamic object compositing, comprising:
  one or more processors; and
  a memory coupled with the one or more processors, the memory configured to store instructions that when executed by the one or more processors cause the one or more processors to:
  receive a first model comprising a representation of a first environment;
  receive a first viewpoint associated with the first model;
  receive a first dynamic object data associated with a first dynamic object;
  perform a simulation within the first model, from the first viewpoint of the first dynamic object that is moving away from a virtual camera at a first initial velocity and a contact between a first scene object and the first dynamic object within the first model;
  generating first synthetic training data comprising a sequence of video frames depicting the simulation of the first dynamic object, wherein the sequence of video frames includes a change in movement of at least one of the first dynamic object or the first scene object resulting from the contact;
  train, based on the first synthetic training data, a machine learning model to simulate changes in movement of dynamic objects resulting from contact with scene objects;
  receive an image comprising a representation of a second environment, wherein the second environment is different from the first environment;
  receive, a second viewpoint associated with the image;
  receive a second dynamic object data associated with a second dynamic object;
  generate movement data of the second dynamic object within the second environment by, at least, applying the trained machine learning model to a second initial velocity and the second viewpoint; and
  superimpose, based on the movement data of the second dynamic object, the second dynamic object into the image.

17. The system of claim 16, wherein the instructions that when executed by the one or more processors further cause the one or more processors to:
  receive a third viewpoint associated with the first model, wherein the third and first viewpoints are different; and
  simulate within the first model, from the third viewpoint, the first dynamic object moving to generate second synthetic training data.

18. The system of claim 16, wherein the instructions that when executed by the one or more processors further cause the one or more processors to:
  receive a third model comprising a representation of a third environment;
  receive a fourth viewpoint associated with the third model; and
  simulate within the third model, from the fourth viewpoint, the first dynamic object moving to generate third synthetic training data.

19. The system of claim 16, wherein the first model is a three-dimensional model.

20. The system of claim 16, wherein the movement data indicates the first dynamic object interacting with one or more scene objects within the first model.

* * * * *